United States Patent [19]

Burton

[11] Patent Number: 5,609,733
[45] Date of Patent: Mar. 11, 1997

[54] SYSTEM AND METHOD FOR CONVERTING TOXIC WASHWATER TO DISTILLED WATER

[75] Inventor: R. Edward Burton, Willits, Calif.

[73] Assignee: Advanced Bio-Gest, Inc., Willits, Calif.

[21] Appl. No.: 432,050

[22] Filed: Apr. 27, 1995

[51] Int. Cl.⁶ .............. B01D 3/00; B01D 3/34; B01D 37/00; C02F 9/00
[52] U.S. Cl. .............. 203/10; 203/49; 203/91; 203/DIG. 4; 203/DIG. 16; 210/262; 210/771; 202/267.1; 159/16.1; 159/43.1; 159/DIG. 3; 159/DIG. 10
[58] Field of Search .............. 210/259, 262, 210/603, 771, 806, 505; 159/16.1, 43.1, DIG. 10, DIG. 3; 203/10, 49, 91, DIG. 4, DIG. 10; 202/267.1

[56] References Cited

U.S. PATENT DOCUMENTS

| | | | |
|---|---|---|---|
| 4,140,737 | 2/1979 | Hauser | 261/93 |
| 4,603,812 | 8/1986 | Stoesser et al. | 239/329 |
| 4,882,058 | 11/1989 | Burton | 210/601 |
| 5,017,124 | 5/1991 | Holly | 425/204 |
| 5,215,625 | 6/1993 | Burton | 162/189 |
| 5,227,027 | 7/1993 | Topper | 203/10 |
| 5,240,611 | 8/1993 | Burton | 210/603 |
| 5,294,303 | 3/1994 | Robbins | 203/10 |
| 5,300,197 | 4/1994 | Mitani et al. | 202/177 |
| 5,387,344 | 2/1995 | McCombs et al. | 210/617 |

Primary Examiner—Nina Bhat
Attorney, Agent, or Firm—Flehr, Hohbach, Test, Albritton & Herbert

[57] ABSTRACT

System and method for treating toxic washwater from ink, paint, pesticides and the like. The wash water is heated to a temperature on the order of 100° F. in a sump positioned beneath a bed of horse manure media containing aerobic fungi and bacteria. Washwater is foam lifted from the sump to a level above the media and allowed to filter down through the media. Hot dry air is blown into the media from the side to maintain the media at a temperature on the order of 100° F. and thereby promote microbiological activity and evaporation of the water in the media. Warm moist air from the media is cooled to condense the moisture, and the condensed moisture is collected as distilled water. A prefilter removes excessive amounts of solids from the washwater before it is introduced into the sump, and a Carnot cycle system provides the necessary heating and cooling for the water, media and air.

19 Claims, 1 Drawing Sheet

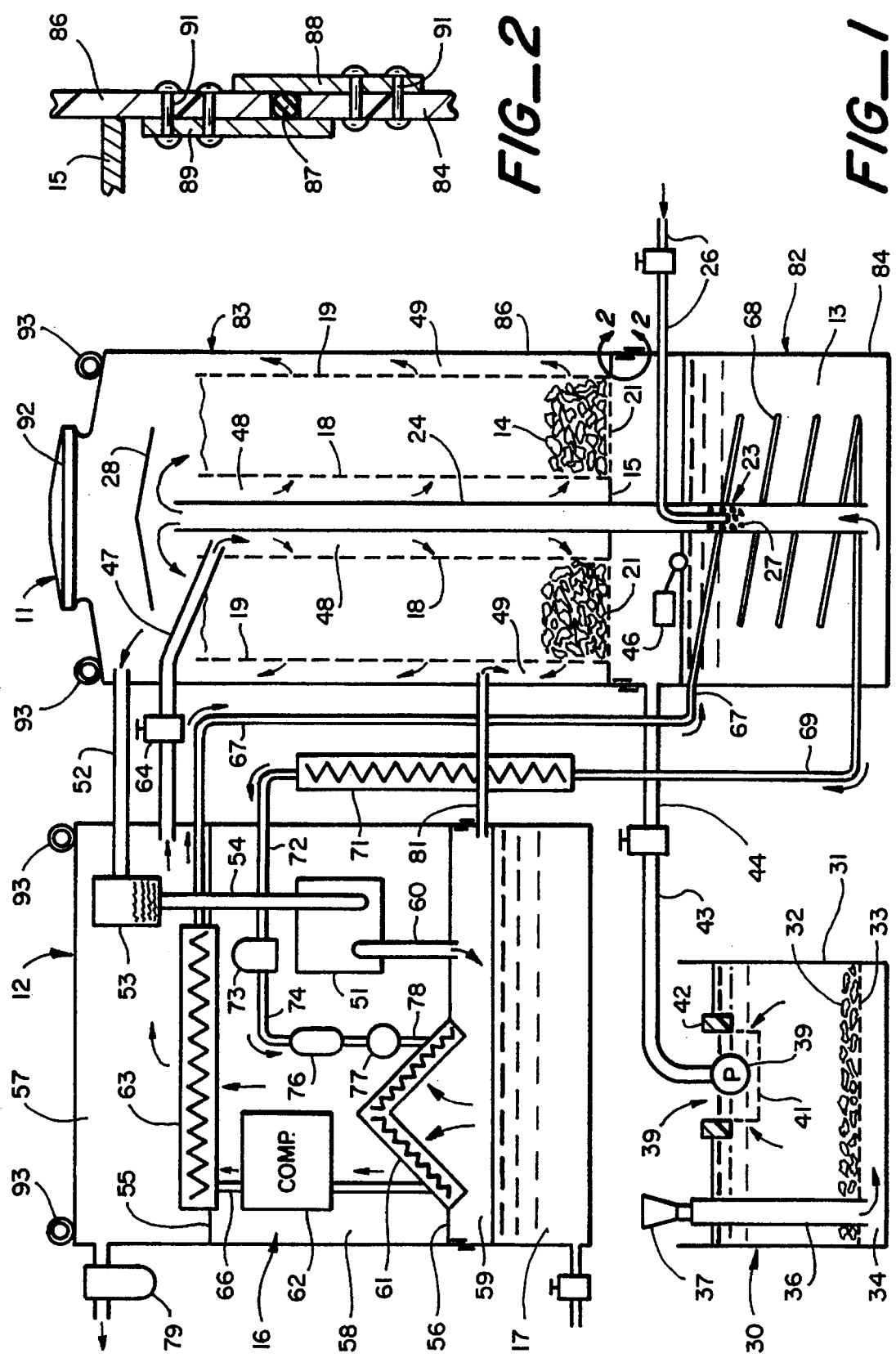

SYSTEM AND METHOD FOR CONVERTING TOXIC WASHWATER TO DISTILLED WATER

BACKGROUND OF THE INVENTION

1. Field of Invention

This invention pertains generally to the treatment of toxic waste materials and, more particularly, to a system and method for converting toxic washwater from ink, paint, pesticides and the like.

2. Related Art

U.S. Pat. No. 4,882,058 discloses a system and method utilizing a compost bed of fecal material containing bacteria, fungi and other organisms which biologically treat or digest liquid borne organic waste materials.

While such systems were a significant improvement over other prior systems for treating toxic waste, they too are subject to certain limitations and disadvantages. The materials which are put into the system for treatment can vary widely in waste content, and people tend to put in materials which are too thick or contain too many solids for the system to handle. Pumps tend to clog, which causes the media to dry out so that no further biological activity can occur. In addition, such systems consume a substantial amount of electric power and are relatively expensive to operate.

OBJECTS AND SUMMARY OF THE INVENTION

It is in general an object of the invention to provide a new and improved system and method for biologically treating toxic waste materials.

Another object of the invention is to provide a system and method of the above character which overcome the limitations and disadvantages of the prior art.

Another object of the invention is to provide a system and method of the above character which are particularly suitable for converting toxic washwater from ink, paint, pesticides and the like to industrial-grade distilled water.

These and other objects are achieved in accordance with the invention by providing a system and method in which toxic washwater from ink, paint, pesticides and the like is heated to a temperature on the order of 100° F. in a sump positioned beneath a bed of horse manure media containing aerobic fungi and bacteria. Washwater is foam lifted from the sump to a level above the media and allowed to filter down through the media. Hot dry air is blown into the media from the side to maintain the media at a temperature on the order of 100° F. and thereby promote microbiological activity and evaporation of the water in the media. Warm moist air from the media is cooled to condense the moisture, and the condensed moisture is collected as distilled water. A prefilter removes excessive amounts of solids from the washwater before it is introduced into the sump, and a Carnot cycle system provides the necessary heating and cooling for the water, media and air.

BRIEF DESCRIPTION OF THE DRAWINGS

FIG. 1 is a schematic diagram of one embodiment of a toxic washwater treatment system in accordance with the invention.

FIG. 2 is an enlarged fragmentary sectional view of a portion of the embodiment of FIG. 1.

DETAILED DESCRIPTION

As illustrated in the drawing, the system includes a filter tank 11 and a clean water tank 12. The filter tank has a sump 13 in the lower portion thereof for receiving the washwater to be treated and a bed of filter media 14 in the upper portion of the tank for removing gross and colloidal solids from the washwater. A baffle plate 15 separates the upper and lower portions of the tank and isolates them from each other. The clean water tank has equipment 16 in the upper portion thereof for cooling warm moist air from the filter media to condense the moisture contained therein and a reservoir 17 in the lower portion of the tank for collecting the condensate. It also contains adequate amounts of nitrates, phosphates and potassium.

The preferred filter media for use in this system is horse manure. The horse manure contains cellulose material in the form of undigested hay which filters colloidal solids out of the washwater. It also contains aerobic fungi and bacteria which digest the organic solids removed from the washwater.

The media bed is arranged in the form of a tall toroid which is bounded by an inner side wall 18, an outer side wall 19 and an annular bottom wall 21. The side walls are cylindrical and are disposed coaxially within the tank. All three walls are fabricated of screen or other perforate material though which air and water can pass freely, with bottom wall 21 opening through baffle plate 15 so that water which is not fully evaporated as it filters through the filter media can drip back into sump 13.

Washwater from the sump is raised by a unique foam lift system to the top of the tank, with the foam flowing out over the upper surface of the media bed and filtering down through the media. The water is raised by means of a foam lift pump 23 which comprises a lift tube 24 and an air supply tube 26. The lift tube extends vertically along the axis of the tank from a level just above the bottom of the tank to a level above the media, and the air supply tube introduces air bubbles 27 into the lower portion of lift tube below the surface of the washwater. The introduction of the air bubbles produces a foamy mixture of washwater and air which is lighter than the surrounding water and is forced up the tube by the foam generated below it.

It has been found that a foam lift pump can lift water or other liquid containing small solids over five feet, whereas an air lift system is not effective over about one foot. The washwater from most paints and inks foams naturally, but a foaming agent such as common household detergent can be added if desired.

A baffle or deflector plate 28 is mounted in the upper portion of the tank above the lift tube for dispersing the foam over the upper surface of the media bed. The foam flowing out the upper end of the tube impinges upon the under side of the deflector plate, falls onto the upper surface of the media bed, and then trickles down through the media and back to the sump.

A prefilter 30 removes a portion of the gross and colloidal solids from the washwater before the water is introduced into the sump. This serves to ensure that the filter will not become overloaded or clogged if someone should introduce washwater containing too many solids into the system.

The prefilter includes a tank 31 which contains a bed of cellulastic fiber media 32 which in one presently preferred embodiment consists of shredded paper currency obtained from the United States Mint. That material has been found to be surprisingly effective in filtering out the solids found in washwater from ink, paint, pesticides and the like.

The media bed rests on a screen 33 which is spaced above the bottom wall of the tank, with a plenum chamber 34 beneath the screen. A riser pipe 36 extends from the top of the tank, through the media bed to chamber 34, with a funnel 37 at the upper end of the pipe to facilitate pouring the water into the pipe.

Water is removed from the upper portion of the prefilter tank by a submersible pump 38 mounted on a float 39. The float comprises a basket 41 fabricated of screen or other perforate material and a float ring 42 which provides enough buoyancy to keep the basket floating with the pump submerged a short distance beneath the surface of the water in the tank. The pump is connected to a flexible discharge line 43 which allows it to float up and down with changes in the level of the water in the tank. The discharge line is connected to a washwater inlet 44 in the side wall of the filter tank just above sump 13. A float switch 46 in the sump controls the operation of the pump and, hence, the amount of washwater delivered to the sump. It is preferable, but not absolutely necessary, that the washwater remain in the prefilter media for approximately 24 hours from the time it enters the tank and the time it is pumped out.

Hot dry air is blown through the media bed to maintain the media at a temperature on the order of 100° F. That promotes the microbiological activity which consumes the organic solids and also promotes evaporation of the water in the media. The air is delivered by a tube 47 to a central plenum chamber 48 inside the media bed and flows into the media through the perforations in inner side wall 18. The air flows through the media in a horizontal or sideways direction and flows out of the media through the openings in outer side wall 19 into an outer plenum chamber 49 formed between that side wall and the side wall of the tank.

As the air passes through the media, it picks up moisture from the evaporating washwater. It also supplies oxygen for the aerobic fungi and bacteria which digest the horse manure media and the contaminants from the washwater.

The warm moist air from the plenum chamber flows toward the top of the tank and is drawn out of the tank by a blower 51 which is mounted in the upper portion of clean water tank 12. The air flows out of the filter tank through an air duct 52 to a carbon filter 53 and from that filter through another air duct 54 to the blower. The carbon filter contains a replaceable carbon pad which collects any droplets or particles in the air.

A pair of baffle plates 55, 56 divide the clean water tank into an upper chamber 57, a central chamber 58 and a lower chamber 59, with the air from blower 51 being directed through an output or discharge duct 60 into the upper portion of the lower chamber above the water in condensate reservoir 17.

The air then passes through a cooling unit 61 where it is cooled to a temperature on the order of 40° F. to condense any moisture which may be present in it. As discussed more fully hereinafter, the cooling unit is part of a Carnot cycle system which includes a heat pump or compressor 62 which is located in central chamber 58. The moisture which condenses on the cooling unit falls into condensate reservoir 17 where it is collected. This water contains less than 20 ppm total dissolved solids, which is substantially cleaner than tap water which typically contains about 300 ppm total dissolved solids. It can be utilized for cleaning equipment or for a number of other industrial uses, water is sometimes referred to as industrial-grade distilled water.

After passing through cooling unit 61, the chilled air flows past blower 51 and compressor 62 in central chamber 58, cooling the compressor and blower and picking up heat from them. The air then passes through a heat exchanger 63, which is also part of the Carnot system, to upper chamber 57 where it is heated to a temperature on the order of 160° F. From chamber 57, the air passes through a vacuum control valve 64 to tube 47 which delivers it to plenum chamber 48 for passage through the media again.

As noted above, the system utilizes a Carnot cycle system for heating and cooling the washwater and the air. The compressor 62 heats a refrigerant gas to a temperature on the order of 180° F., and the hot gas is delivered to heat exchanger 63 through a flow line 66. In the heat exchanger, the temperature of the gas is reduced to about 160° F. From the heat exchanger, the gas is delivered through a line 67 to a heating coil 68 in sump 13 to maintain the washwater in the sump at a temperature on the order of 100° F.

The gas leaves the cooling coil at a temperature on the order of 110° F. and flows through a line 69 to a cooling coil 71 which is exposed to ambient air outside the tanks. The gas leaves this coil at a temperature on the order of 80° F. to 90° F. and passes through a flow line 72 to a receiver 73, and from the receiver through a flow line 74 and filter 76 to an expansion valve 77. The expansion valve causes the gas to expand and cool to a temperature on the order of 34° F.

The cool gas from the expansion valve passes through a flow line 78 to cooling unit 61 where it cools the moist air from the media as discussed above. The cooling unit comprises one or more cooling coils mounted in an opening in baffle plate 56.

The chambers in the upper portions of tanks 11, 12 are maintained at a negative or vacuum pressure (e.g., 40 inches water column) by the action of blower 51, whereas chamber 59 is at maintained at a slight positive pressure (e.g., 2 inches water column). The vacuum pressure in the filter tank increases evaporation of the water and eliminates the need for a pump to supply air to the foam lift. It is also believed to promote more rapid biological action in the digestion of the organic contaminants. The level of vacuum in the filter tank is controlled by vacuum control valve 64 which controls the air flow through tube 47.

Air supply tube 26 for the foam lift pump 24 opens to the atmosphere outside the tanks, and with the filter tank operating under vacuum, air from the outside is drawn into the system through this line to operate the foam lift. Although the amount of air drawn into the system in this manner is relatively small, a corresponding amount of air must be discharged from the system in order to keep it in balance. In the embodiment illustrated, the air is discharged from the upper portion of chamber 57 through a carbon filter 79 to the atmosphere.

An overflow line 81 extends from the upper portion of clean water reservoir 17 to the upper portion of sump 13 to return excess clean water from the reservoir to the sump. This prevents the clean water reservoir from overflowing and the water level in the sump from becoming too low to operate the foam lift. That permits the system to operate continuously even during periods such as weekends and holidays when no wastewater is generated, and the biota in the filter tank have been found to be most effective when the system operates continuously.

Filter tank 11 is preferably constructed as a rotomolded vessel of polyethylene or other chemically resistant plastic. It has a lower, or base, section 82 in which the sump is located and an upper section 83 in which the media bed is located. The two sections have cylindrical side walls 84, 86 of like diameter, and the upper section rests upon the lower section, with an O-ring 87 providing an air-tight seal between the two. The two sections are held in proper alignment by a pair of circular hoops or flanges 88, 89 at the junction of the side walls. Flange 88 is affixed to the outer side of the lower side wall and extends a short distance above that wall, along side the lower portion of the upper side wall. Flange 89 is affixed to the inner side of the upper side wall and extends a short distance below that wall, alongside the upper portion of the lower side wall. The two flanges are fabricated of a suitable material such as stainless steel and are attached to the side walls by rivets 91 or other suitable means. The difference in pressure outside and inside the vessel holds the two sections together tightly, with no clamps or other fasteners being required to secure them. A removable lid 92 on the top wall of the upper section provides access to the interior of the vessel, and lift rings 93 are affixed to the top wall for use in raising the section.

Clean water tank 12 is constructed in a similar manner, and separates between baffle 56 and the top of reservoir 17. Both tanks can be provided with a protective outer jacket (not shown) of metal or other suitable material, with insulation (not show) between the tank walls and the jackets to minimize heat loss.

Operation and use of the system, and therein the method of the invention, are as follows. The media are loaded into filter tank 12 and prefilter 30, and toxic washwater from ink, paint, pesticides or the like is poured into the prefilter. The washwater enters the cellulastic fiber material from below and filters up through it. Washwater from the upper portion of the tank is pumped to sump 13.

Washwater in the sump is foam lifted to the top of the filter tank, distributed over the surface of media bed 14 and allowed to filter back down through the media. As the water passes through the horse manure, cellulose material in the manure filters colloidal solids out of the water, and aerobic fungi and bacteria digest the organic solids and the manure itself. Warm air is blown through the media bed from the side to warm the media, promote the biological process, and promote vaporization of the water in the media.

As the warm air passes through the media, it picks up moisture from the washwater. The moist air is removed from the tank by blower 51 and passed through cooling unit 61 where it is cooled to a temperature on the order of 40° F. to condense the moisture in it. The condensate falls into reservoir 17 where it is collected.

After passing through cooling unit 61, the chilled air flows past blower 51 and compressor 62, cooling them and picking up heat from them. The air then passes through heat exchanger 63, where it is heated to a temperature on the order of 100° F. From the heat exchanger, the air is once again passed through the media in the filter tank.

When the system is properly sized and operated, the horse manure media and the organic paint or ink solids trapped therein are digested to form metabolic energy, carbon dioxide and water. In the event that the media becomes clogged due to overloading or difficult contaminants in the washwater, it can be replaced. New horse manure can be added through the opening in the top wall of the tank. A buildup of inorganic salts can also make it necessary to change the media, but those salts tend to build up relatively slowly, and generally do not require replacement of the media more often than about once a year.

The media is removed by raising the upper section of the vessel and cutting away or removing all or a portion of the screen which forms outer side wall 19 to get to the media. After the media has been removed, the screen is replaced, the upper section is lowered, and fresh media is loaded into the tank through the opening in the top wall of the vessel.

When the cellulastic fiber material in the prefilter becomes loaded with solids, it too can be removed and molded into useful products. In this case, however, rather than removing the material from the tank and loading it into another vessel for transport to the processing plant, the float and pump are removed, a lid is placed on the tank, and the media can be transported in the tank to a facility where molded products are made. A preferred technique which can be utilized in molding and drying the spent cellulose material to form products such as stepping stones, statues, and the like is described in U.S. Pat. No. 5,215,625.

The invention has a number of important features and advantages. The prefilter and the foam lift pump reduce the chance of the filter media becoming overloaded or clogged. The prefilter removes excessive solids from the wastewater before it enters the filter tank, and the foam lift is far less susceptible to clogging than other types of pumps. The ability to resist clogging is particularly important because if the filter media were to dry out and the pigments in the wastewater were to set, no more biological activity could occur, and the media would have to be replaced. The toroidal arrangement of the media and the passage of air through the media in a sideways direction provides more active media per unit volume with less air channeling and media caking. With the Carnot cycle system providing the heating cooling, the maximum heat generated in the system is only about 180° F., which eliminates the possibility of fire and further reduces caking of the media. The system consumes only about one-eighth as much electric power as a prior art system of comparable capacity and is therefore significantly more economic to operate. The negative pressure in the filter tank promotes evaporation of the water in the media, whereas the slight positive pressure in the condensation section favors condensation. The use of rotomolded polyethylene tanks provides chemically resistant, low-cost containment, and the manner in which the tank sections are held together without fasteners provides easy access to the interior of the filter for maintenance or media replacement. The system can operated unattended for long periods of time, and the overflow tube will convey clean water back to the sump to prevent the sump from running dry and the system from breaking down.

It is apparent from the foregoing that a new and improved system and method for the treatment of toxic washwater have been provided. While only certain presently preferred embodiments have been described in detail, as will be apparent to those familiar with the art, certain changes and modifications can be made without departing from the scope of the invention as defined by the following claims.

I claim:

1. A method for converting toxic washwater to industrial-grade distilled water, comprising the steps of: heating the washwater to a temperature on the order of 100° F. in a sump positioned beneath a bed of horse manure media which contains aerobic fungi and bacteria for filtering out and digesting gross and colloidal particles from liquid in the media, foam lifting washwater from the sump to a point above the media bed, distributing the water over the upper surface of the media bed and allowing the water to filter down through the media, blowing hot dry air through the media to maintain the media at a temperature on the order of 100° F. and thereby promote microbiological activity and evaporation of the water in the media, passing warm moist air from the media through a cooler to condense moisture contained in the air, and collecting the condensed moisture from the cooler as distilled water.

2. The method of claim 1 including the steps of heating the air from the cooler to a temperature on the order of 140° F., and returning the heated air to the media.

3. The method of claim 1 including the steps of heating a refrigerant gas, delivering the heated gas to a heat exchanger to heat air from the cooler for delivery to the media bed, delivering the gas from the heat exchanger to a heating coil in the sump to heat the water in the sump, reducing the temperature of gas from the heating coil in an expansion valve, and delivering the gas from the expansion valve to the cooler to condense the moisture in the air from the media.

4. The method of claim 1 wherein the washwater is prefiltered to remove gross solids and colloidal solids before delivery to the sump by the steps of introducing the washwater into the lower portion of a tank containing a cellulastic fiber media, allowing the water to filter up through the fiber media to effect removal of gross solids and colloidal solids from the water, and delivering the filter water from an upper portion of the tank to the sump.

5. The method of claim 1 wherein the media bed and the sump are enclosed within a vessel, and a vacuum pressure on the order of 40" water column is maintained in the vessel.

6. A system for converting toxic washwater to industrial-grade distilled water, comprising: a sump in which the washwater is heated to a temperature on the order of 100° F., a bed of horse manure media positioned above the sump containing aerobic fungi and bacteria for filtering out and digesting gross and colloidal particles from liquid in the media, means including a foam lift pump for pumping washwater from the sump and distributing it over the upper surface of the media bed so that the water can filter down through the media, means for blowing hot dry air into the media to maintain the media at a temperature on the order of 100° F. and thereby promote microbiological activity and evaporation of the water in the media, means for passing warm moist air from the media through a cooler to condense moisture contained in the air, and means for collecting the condensed moisture from the cooler as distilled water.

7. The system of claim 6 including means for heating the air from the cooler to a temperature on the order of 140° F. and delivering the heated air to the blowing means.

8. The system of claim 6 including a Carnot cycle heat pump for heating a refrigerant gas, a heat exchanger connected to the heat pump for heating air for delivery to the blowing means with heat from the gas, a heating coil connected for receiving the gas from the heat exchanger and transferring heat from the gas to the water in the sump, an expansion valve for reducing the temperature of gas from the heating coil, and means for delivering the gas from the expansion valve to the cooler to condense the moisture in the air from the media.

9. The system of claim 6 including a prefilter for removing gross and colloidal solids from the washwater before the washwater is delivered to the sump, said prefilter comprising a tank containing a cellulastic fiber media adapted to filter out gross and colloidal solids, means for introducing the washwater into the tank beneath the fiber media and allowing the water to filter up through the fiber media, and means for delivering the filtered water from an upper portion of the tank to the sump.

10. The system of claim 9 wherein the cellulastic fiber media contains shredded paper currency.

11. The system of claim 6 wherein the media bed and the sump are enclosed within a vessel in which a vacuum pressure on the order of 40" water column is maintained.

12. The system of claim 6 wherein the media bed and the sump are enclosed within a vessel fabricated of chemically resistant plastic and formed in two sections having axially abutting cylindrical side walls, with a pair of cylindrical flanges holding the two sections in alignment with each other and permitting the two sections to be separated for removal of the media.

13. A system for converting toxic washwater to industrial-grade distilled water, comprising: a vessel having a sump in the lower portion thereof for receiving the washwater, means for maintaining water in the sump at a temperature on the order of 100° F., a pair of coaxially disposed generally cylindrical inner and outer perforate side walls in the vessel above the sump, a bed of horse manure media containing aerobic fungi and bacteria between the side walls for filtering out and digesting gross and colloidal particles from liquid in the media, a pipe extending from a level above the media into the washwater in the lower portion of the vessel, means for introducing air at a pressure greater than the pressure within the vessel into the washwater near the lower end of the pipe to produce a foam which flows up the pipe, means in the upper portion of the vessel for distributing the foam over the surface of the media so that the water in the foam can filter down through the media, means for blowing hot dry air into the media through the inner perforate side wall to maintain the media at a temperature on the order of 100° F. and thereby promote microbiological activity and evaporation of the water in the media, with warm moist air passing out of the media through the outer perforate side wall, and means for condensing moisture in the air from the media to produce distilled water.

14. The system of claim 13 wherein the vessel is fabricated of chemically resistant plastic and formed in two sections with axially abutting cylindrical side walls, with a pair of cylindrical flanges holding the two sections in alignment with each other and permitting the two sections to be separated for removal of the media.

15. The system of claim 14 wherein the side wall of the vessel is fabricated of polyethylene and formed by roto-molding.

16. A system for processing toxic washwater comprising: a tank containing a cellulastic fiber media adapted to filter out gross and colloidal solids, means for introducing the washwater into the tank toward the bottom the fiber media and allowing the water to filter up through the fiber media, and means for removing the filtered water from an upper portion of the tank.

17. The system of claim 16 wherein the cellulastic fiber media contains shredded paper currency.

18. The system of claim 16 wherein the means for removing the filtered water comprises a float submerged in the upper portion of the media, and a pump carried by the float for discharging water from the media.

19. A system for processing toxic washwater, comprising: a sump for receiving the washwater, a bed of horse manure media containing aerobic fungi and bacteria for filtering out and digesting gross and colloidal particles from liquid in the media, means for passing washwater from the sump through the media, a Carnot cycle heat pump for heating a refrigerant gas to a temperature on the order of 180° F., a heat exchanger connected to the heat pump for heating air to a temperature on the order of 160° F., means for directing the heated air through the media to promote microbiological activity and evaporation of the water in the media, a heating coil in the sump for receiving the gas from the heat exchanger and transferring heat from the gas to the washwater in the sump to maintain the washwater at a temperature on the order of 100° F., means for expanding the gas from the heating coil to cool the gas to a temperature on the order of 34° F. and delivering the cooled gas to a cooling coil, means for exposing air passing through the media to the cooling coil to cool the air and condense moisture contained in the air, means for collecting condensed moisture from the cooling coil, and means for returning the cooled air to the heat exchanger to be heated and directed through the media again.

* * * * *